(12) United States Patent
Garner et al.

(10) Patent No.: US 9,360,121 B2
(45) Date of Patent: Jun. 7, 2016

(54) PLANTER AND SEED METER FOR PLANTING MULTIPLE SEED VARITIES

(71) Applicant: Deere & Company, Moline, IL (US)

(72) Inventors: Elijah B. Garner, Bettendorf, IA (US); Andrew J. Schwartz, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 98 days.

(21) Appl. No.: 14/098,265

(22) Filed: Dec. 5, 2013

(65) Prior Publication Data

US 2014/0174330 A1 Jun. 26, 2014

Related U.S. Application Data

(60) Provisional application No. 61/740,732, filed on Dec. 21, 2012.

(51) Int. Cl.
   *F16K 3/02* (2006.01)
   *A01C 7/04* (2006.01)
   *A01C 7/20* (2006.01)
   *A01C 21/00* (2006.01)

(52) U.S. Cl.
   CPC . *F16K 3/02* (2013.01); *A01C 7/046* (2013.01); *F16K 3/0254* (2013.01); *A01C 21/005* (2013.01)

(58) Field of Classification Search
   CPC ............. F16K 3/02; F16K 3/00; A01C 7/046; A01C 7/044; A01C 7/042; A01C 7/04; A01C 7/00; A01C 21/005; A01C 21/00; A01C 7/20; A01C 7/206
   See application file for complete search history.

(56) References Cited

U.S. PATENT DOCUMENTS

| | | | |
|---|---|---|---|
| 5,170,909 | A | 12/1992 | Lundie et al. |
| 6,609,468 | B1 | 8/2003 | Meyer et al. |
| 6,688,244 | B1 | 2/2004 | Meyer et al. |
| 7,025,010 | B2 | 4/2006 | Martin et al. |
| 2010/0101469 | A1 | 4/2010 | Landphair et al. |
| 2010/0282143 | A1 | 11/2010 | Preheim et al. |
| 2011/0098851 | A1 | 4/2011 | Glendenning et al. |
| 2011/0178632 | A1 | 7/2011 | Straeter |

OTHER PUBLICATIONS

International Search Report and the Written Opinion of the International Searching Authority, dated Apr. 29, 2014 (9 pages).

*Primary Examiner* — Christopher J Novosad

(57) ABSTRACT

A seed planter and seed meter for planting different seed varieties based on the location of the machine in a field. A movable gate switches between seed varieties. The gate in one embodiment has three positions; one position opening a first seed passage to the meter and closing a second seed passage, a second position opening the second seed passage and closing the first seed passage and a third position closing both the first and second seed passages. Two other gate embodiments have only two positions, each position opening one seed passage and closing the other.

18 Claims, 13 Drawing Sheets

PLANTER AND SEED METER FOR PLANTING MULTIPLE SEED VARITIES

FIELD

This disclosure relates to seed planters and in particular to planters adapted to planting two or more varieties of seed based on the location of the planter in a field.

DETAILED DESCRIPTION

Most crop production is carried out by seeding an entire field with one seed variety. However, sufficient agronomic data is now available to utilize site specific planting prescriptions that use two or more seed varieties in a given field to increase yields. Various factors are used to determine the best variety for a given location. One area of a field may be lower and typically wetter than other areas. The increased moisture alone may suggest a different variety in that location. In addition, the moisture may result in increased weed or pest pressure in that location necessitating other varieties with resistance to those pressures. To plant the field most efficiently with parallel back and forth passes, and to plant with multiple site specific varieties, it is necessary to switch back and forth between varieties numerous times based on the location of the machine in the field.

Figure 1:
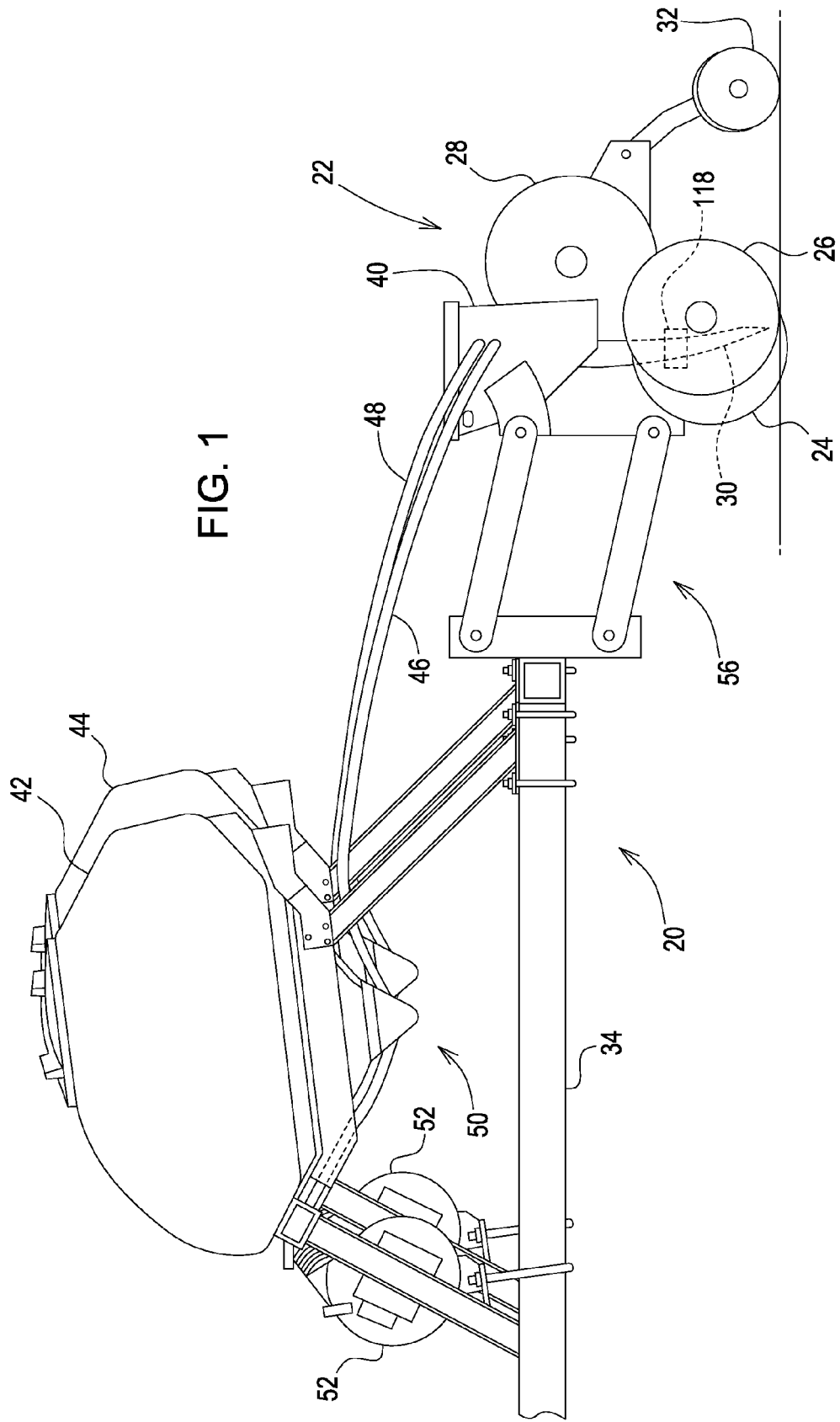
FIG. 1 is a side view of a seeding machine illustrating the seed storage tanks and a planting row unit.

With reference to FIG. 1, a seeding machine, in the form of a row crop planter 20, is shown which is capable of switching between seed varieties without stopping the machine. Planter 20 is equipped with multiple planting row units 22, only one of which is shown. Row unit 22 is only one example of many different types of row units that can be used to plant seed. Row unit 22, as shown, includes an opener 24 that forms a shallow furrow in the soil as the machine traverses a field. Gauge wheels 26 control the depth of the furrow. A seed meter 28 meters seed to deliver individual seeds sequentially to a seed tube 30 that directs the seed to the furrow beneath the meter. A closing wheel or other device 32 trails behind and covers the deposited seed with soil. Each row unit 22 is mounted to the machine frame 34 by a parallel linkage 56 (FIG. 1) so that the individual row units 22 may move up and down to a limited degree relative to the frame 34. Multiple row units 22 are mounted to the frame 34 such that multiple parallel rows are planted with each pass of the machine through a field.

Each seed meter is equipped with a small seed hopper 40 commonly referred to as a mini-hopper. Seed from two or more tanks 42, 44 is delivered to the mini-hopper pneumatically through tubes 46, 48. Tube 46 extends from tank 42 to the mini-hopper 40 and tube 48 extends from the tank 44 to the mini-hopper 40. Each tank 42, 44 carries a different seed variety such that each variety is delivered to the each mini-hopper. The tanks and tubes are part of a pneumatic seed delivery system 50 such as those shown in U.S. Pat. Nos. 6,609,468; 6,688,244; and 7,025,010, incorporated herein by reference. Seed delivery system also includes a fan or fans 52 to provide the air stream to convey the seed through the tubes 46, 48.

Figure 2:
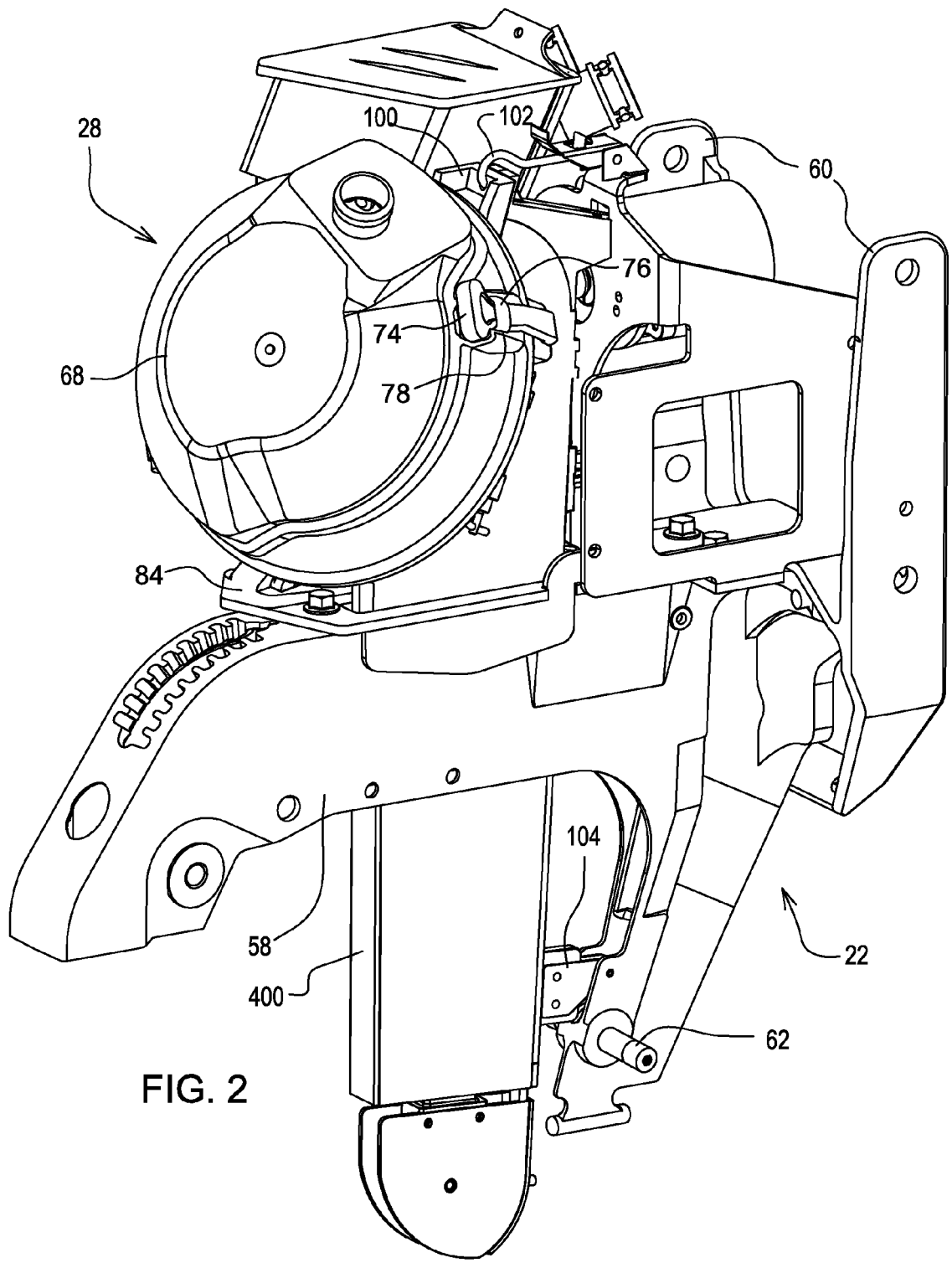
FIG. 2 is a perspective view of a portion of another embodiment of a planter row unit.
Figure 3:
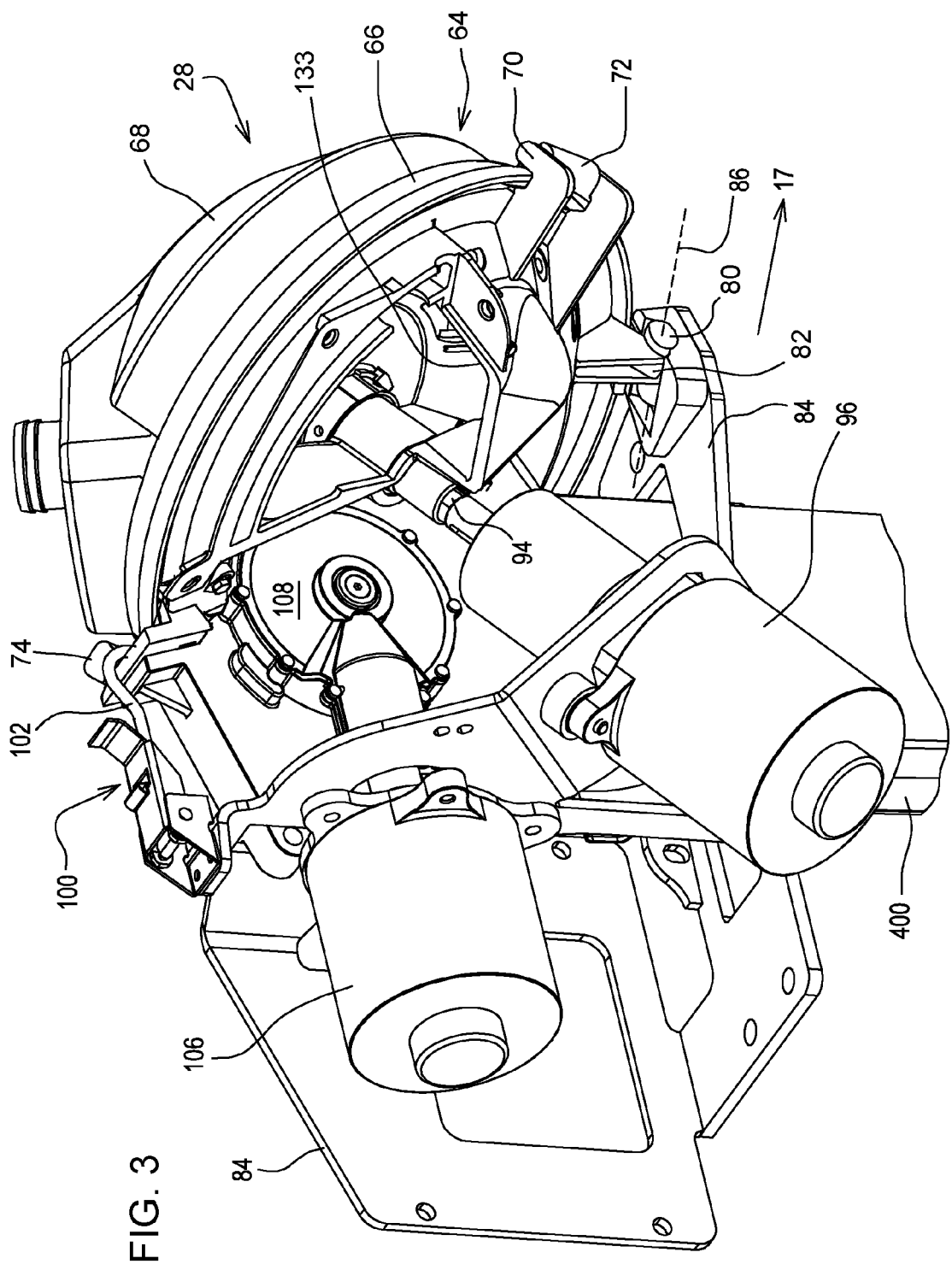
FIG. 3 is a perspective view of the front of the planter row unit of FIG. 2.

The row unit 22 and seed meter 28 are shown in greater detail in FIGS. 2 and 3 with the row unit in which the components are arranged somewhat differently from that shown in FIG. 1 but with the same essential components. Each row unit 22 has a frame member 58 (FIG. 2) to which the components of the row unit are mounted. The frame member 58 includes a pair of upstanding arms 60 at the forward end of thereof. The arms 60 are coupled to the rearward ends of the parallel linkage 56. Furrow opening disks 24 are attached to shafts 62 in a known manner to form an open furrow in the soil beneath the seeding machine into which seed is deposited. A seed meter 28 and a seed delivery system 400 are also attached to the frame member 58 of each row unit. The seed delivery system 400 replaces the seed tube 30 of FIG. 1.

Figure 4:
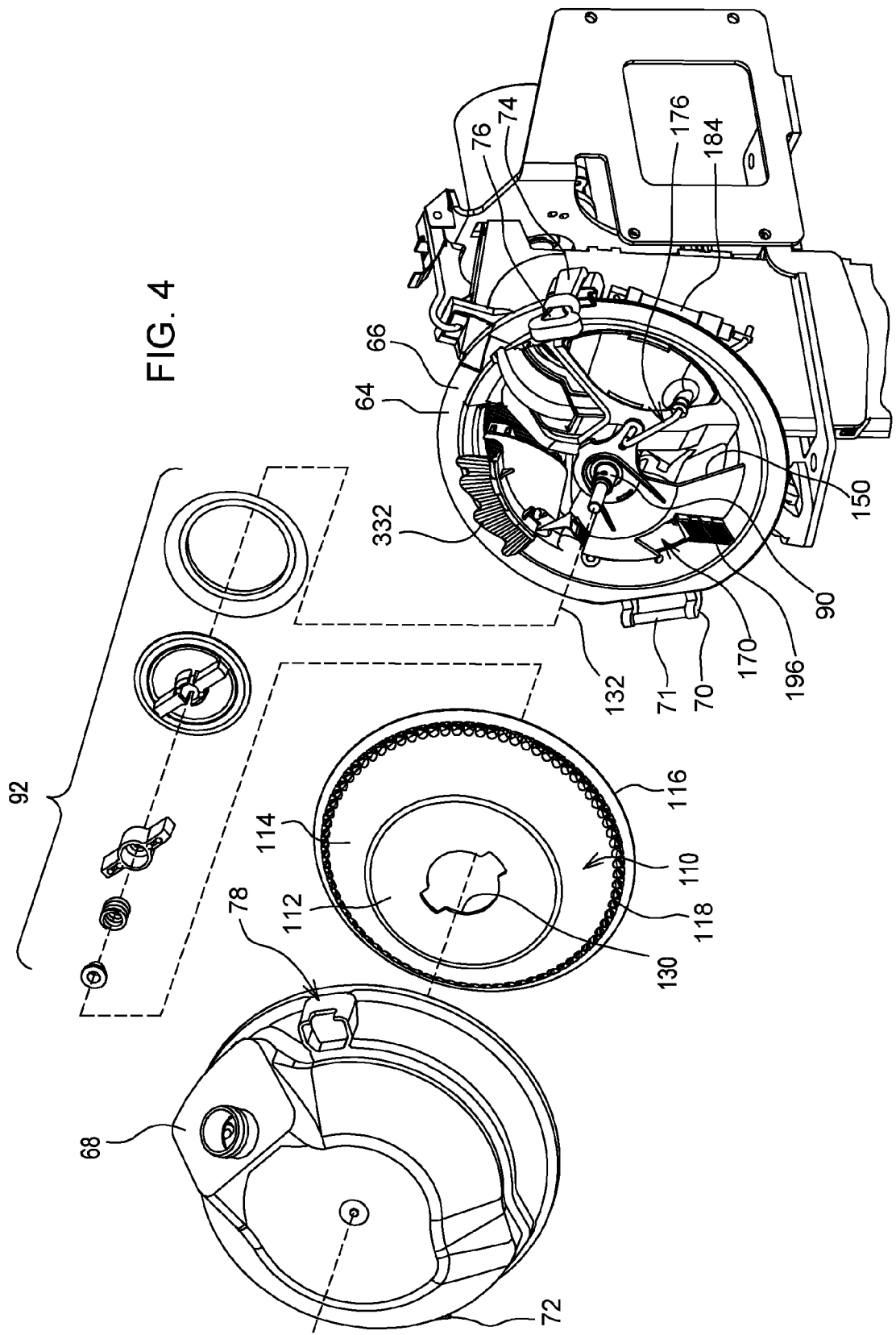
FIG. 4 is an exploded perspective view of the seed meter of the row unit of FIGS. 2 and 3.

The meter 28 includes a housing 64 (FIG. 3) that consists of a housing body 66 and a cover 68. The housing body 66 and the cover 68 are coupled to one another by complementary hinge features 70 and 72 on the housing body and cover respectively. Hinge feature 70 includes a pivot pin 71 (FIG. 4) coupled to the housing body while the feature 72 is an integrally formed hook that wraps around the pivot pin 71 allowing the cover 68 to pivot about the axis of the pin. An elastomeric latch member 74 is coupled to the housing body 66 and has an enlarged portion 76 that is seated into a socket 78 formed in the cover to hold the cover in a closed position on the housing body 66.

The housing body 66 is formed with a second hinge element in the form of a pivot pin 80 (FIG. 3). Pivot pin 80 is seated into a hook member 82 of the mounting frame 84 attached to the frame member 58. This allows the seed meter 28 to pivot relative to the row unit frame member 58 about an axis 86. A drive spindle 90 (FIG. 4) is carried by the housing body 66 and has a drive hub 92 on the end thereof. The spindle 90 couples to the output shaft 94 of electric motor 96 to drive the seed meter when in the assembled position shown in FIG. 3. The seed meter 28 is coupled to the delivery system 400 by a latch mechanism 100 including a metal rod 102 having a hook at one end seated into an aperture in the meter housing body 66 when latched. The delivery system further has a mounting hook 104, partially shown in FIG. 2, which attaches to the planting unit frame member 58 to support the delivery system. The delivery system 400 is driven by an electric motor 106, also carried by the mounting frame 84. The output shaft of motor 106 is connected to the delivery system through a right-angle drive 108.

A metering member 110 is disposed in the interior of the meter housing 64. Metering member 110 is a single piece, concave bowl shaped body. The bowl shaped body has a base portion 112 from which extends a sidewall 114. Sidewall 114 terminates in an outer edge 116. Near the outer edge 116 there is an annular array of apertures 118 that extend through the sidewall. The base portion 112 of the metering member contains a central drive aperture 130 (FIG. 4) used to mount the metering member on the rotational drive hub 92 for rotation about the axis 132. In operation, as the metering member rotates, individual seeds from a seed pool located adjacent the inner side of the metering member are adhered to the apertures 118 and sequentially carried upward to a release position where the seeds are individually removed by the delivery system 400.

Figure 5:
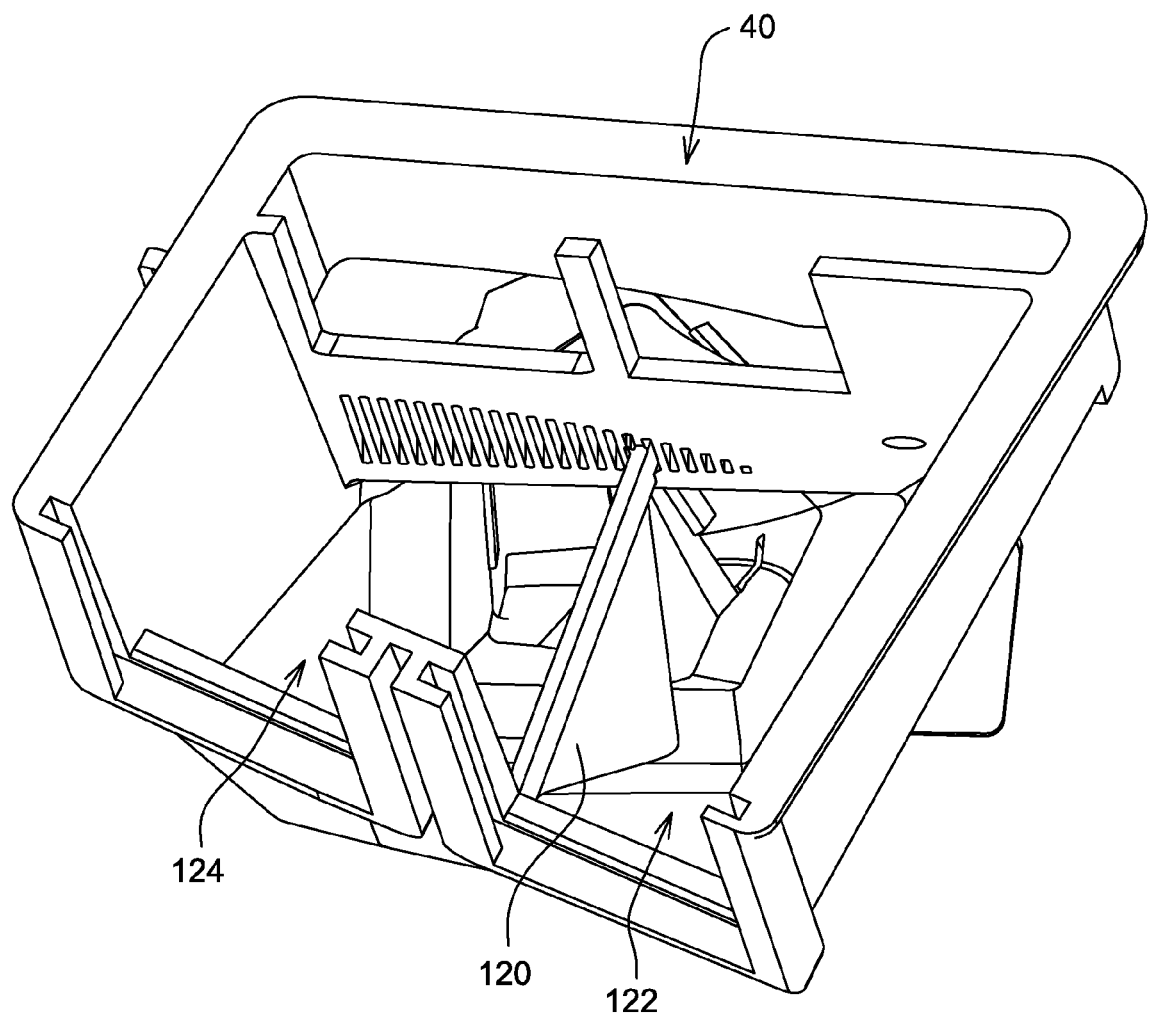
FIGS. 5 and 6 are perspective views of the mini-seed hopper of the seed meter of FIGS. 2 and 3.
Figure 6:
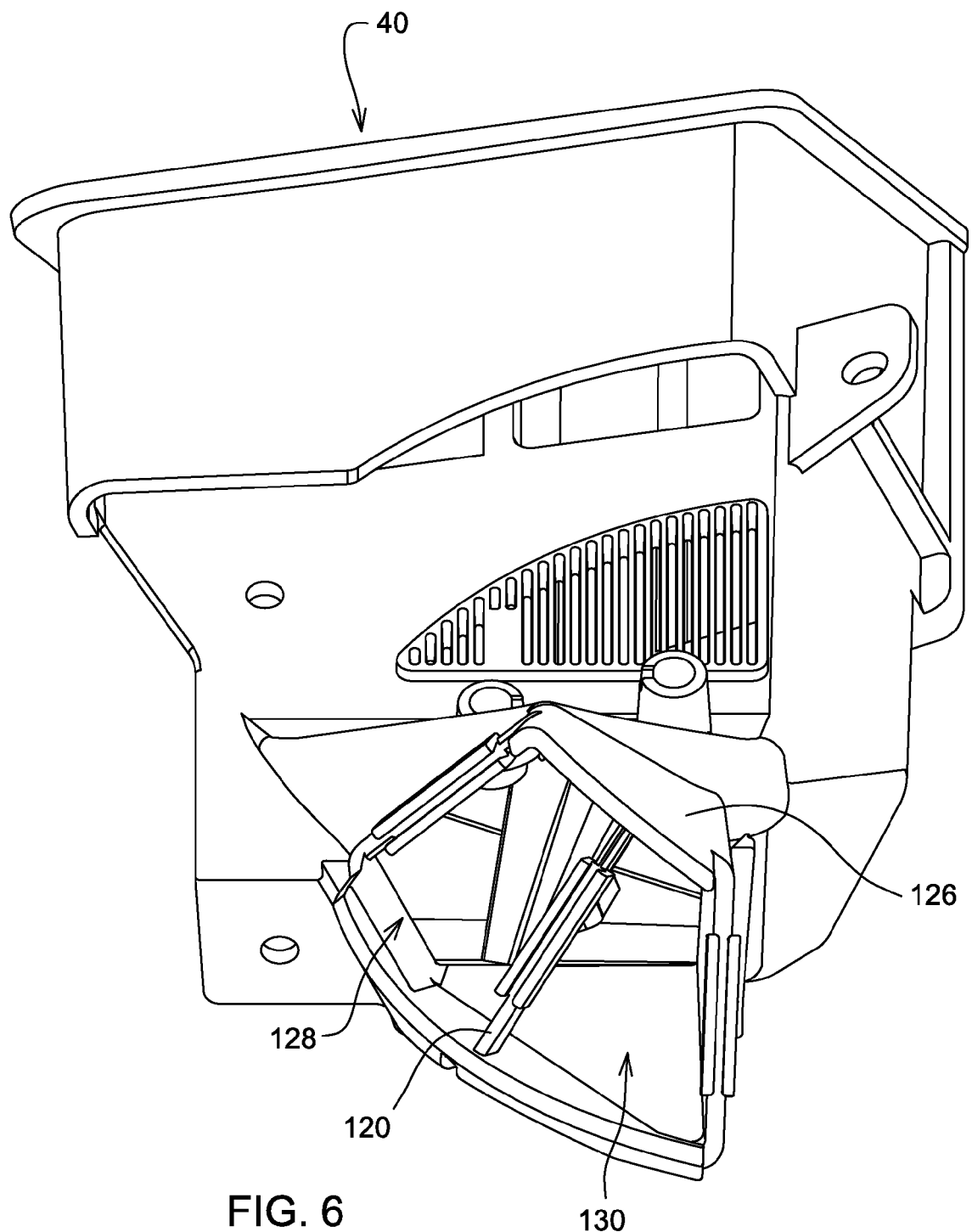

The mini-hopper 40 is shown in greater detail in FIGS. 5 and 6 where the hopper body is shown without the removable cover or vent screens. The interior of the hopper is divided in two by a wall 120 forming two chambers, 122 and 124. Seed hose 46 from tank 42 passes into the hopper and terminates in the chamber 122 whereby seed from the tank 42 is deposited in the chamber 122. Likewise, the hose 48 passes into the hopper and terminates in the chamber 124 to deposit seed therein. At the lower end, the hopper includes a seed chute portion or conduit 126 which is divided by the wall 120 into two seed passages 128 and 130 which are at the lower ends of the chambers 122 and 124 respectively. The hopper connects to the meter housing body 66 at the opening 133 in the body with the chute portion 126 extending into the interior of the housing body. While the hopper is shown as a single piece plastic molding with a chute having two seed passages, it will be appreciated that separate hoppers for the two seeds are possible and separate conduits, each forming a seed passage is also possible. Further, with separate conduits or chutes, the housing body 66 could have separate openings therein for the seed passages. The claims that following should be broadly construed to cover these variations.

Figure 7:
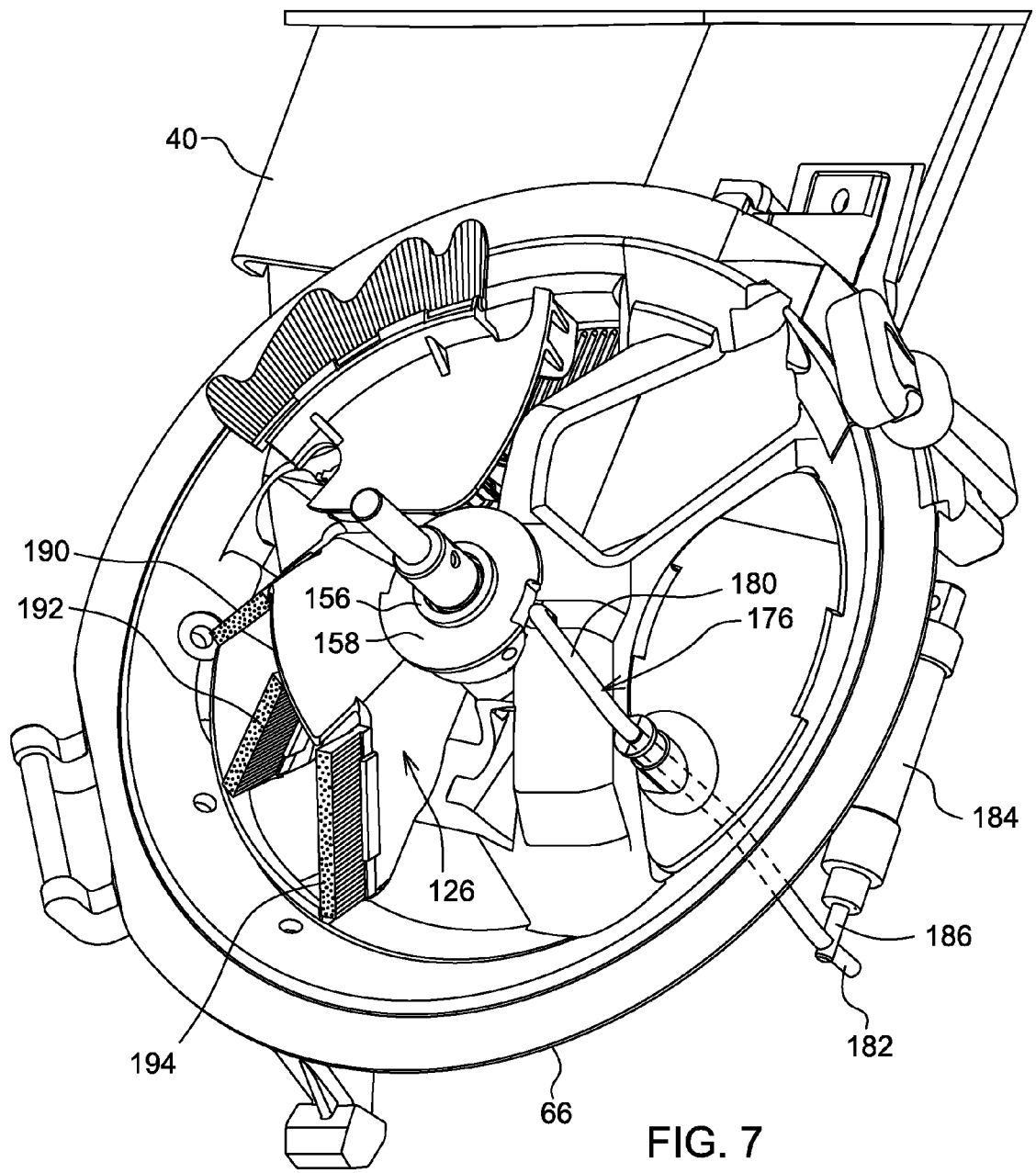
FIG. 7 is a perspective view of the interior of the seed meter of the row unit of FIGS. 2 and 3 without the gate for switching between seed varieties.
Figure 8:
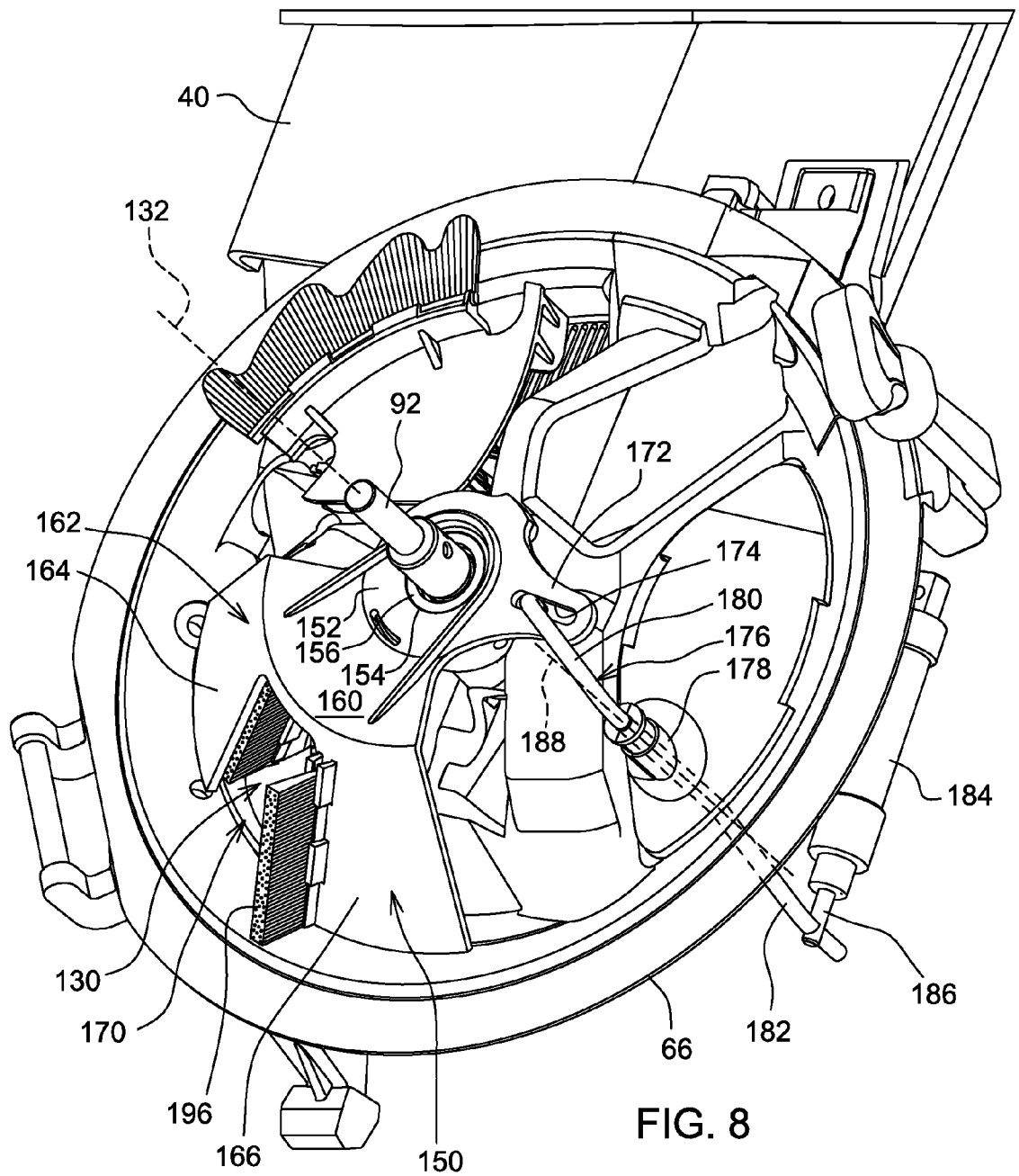
FIGS. 8 and 9 are perspective views of the meter like FIG. 7 with the gate included for switching between seed varieties with the gate shown in two different positions.

A single piece gate 150 (FIG. 8) is mounted in the housing and movable to various positions to close or open the ends of the seed passages 128, 130. The gate 150 includes a hub portion 152 mounting the gate in the meter housing for rotation substantially about the meter axis 132. The hub portion includes an aperture 154 that fits over an annular rib 156 on a bushing 158 (FIG. 7). As shown in FIGS. 7 and 8, the rib is concentric about the meter axis 132 but it need not be so. It is possible for the axis of rotation of the gate 150 to be different from the axis 132 if desired.

The gate 150 has a first radial arm portion 160 extending radially from the hub portion 152. Connected to the first radial arm portion is a paddle portion 162. In the embodiment shown in FIG. 8, the paddle portion includes two wall portions 164 and 166 separated by a window 170. The gate further has a second radially arm portion 172 with a slot 174. A crank or linkage 176 formed of a metal rod is rotatably mounted to the housing body 66 by a bushing 178 snap fit to the housing body. The end of one arm 180 of the crank is disposed in the slot 174. The end of the other arm 182 of the crank is located on the exterior of the meter housing and is coupled to a linear actuator 184 attached to the outside of the housing body 66.

The hub portion 152, the first radial arm portion 160 and the second radial arm portion 172 all lie generally in the same plane. The paddle portion 162 is inclined to the common plane of the hub portion and the radial arms. The paddle portion is shaped as a portion of a frustum of a cone and generally matches the contours of the inside of the metering member 110.

Operation of the linear actuator to extend or retract the plunger 186 causes the crank to rotate about the axis 188 defined by the bushing 178. Rotation of the crank in turn causes the gate to rotate about its rotational axis, moving the wall portions to different locations to open or close the passages 128 and 130 to the interior of the meter housing. The linear actuator can be electronic, hydraulic, pneumatic, etc. The type of linear actuator is not critical to the operation of the seed meter.

Brushes 190, 192, and 194 on the bottom edges of the hopper 40 form seals between the hopper and the paddle portion 162 of the gate 150. The brushes keep seed in the seed passages 128 and 130 from mixing with one another and from moving to other areas in the interior of the meter housing. A brush 196 mounted on the wall portion 166 of the gate, adjacent and below the window 170, forms a seal between the gate 150 and the surface of the metering member 110.

With reference to FIG. 8, the gate 150 is in a position where the wall portion 164 covers and closes the seed passage 128. This prevents seed from the passage 128 from flowing into the meter housing. The window 170 is aligned with the seed passage 130, allowing seed from the passage 130 to flow into the meter housing and form a small seed pool in contact with the surface of the metering member 110. The brush 196 defines a lower boundary of the seed pool and keeps seed from moving downward, beyond the window 170 to the bottom of the housing body.

Figure 9:
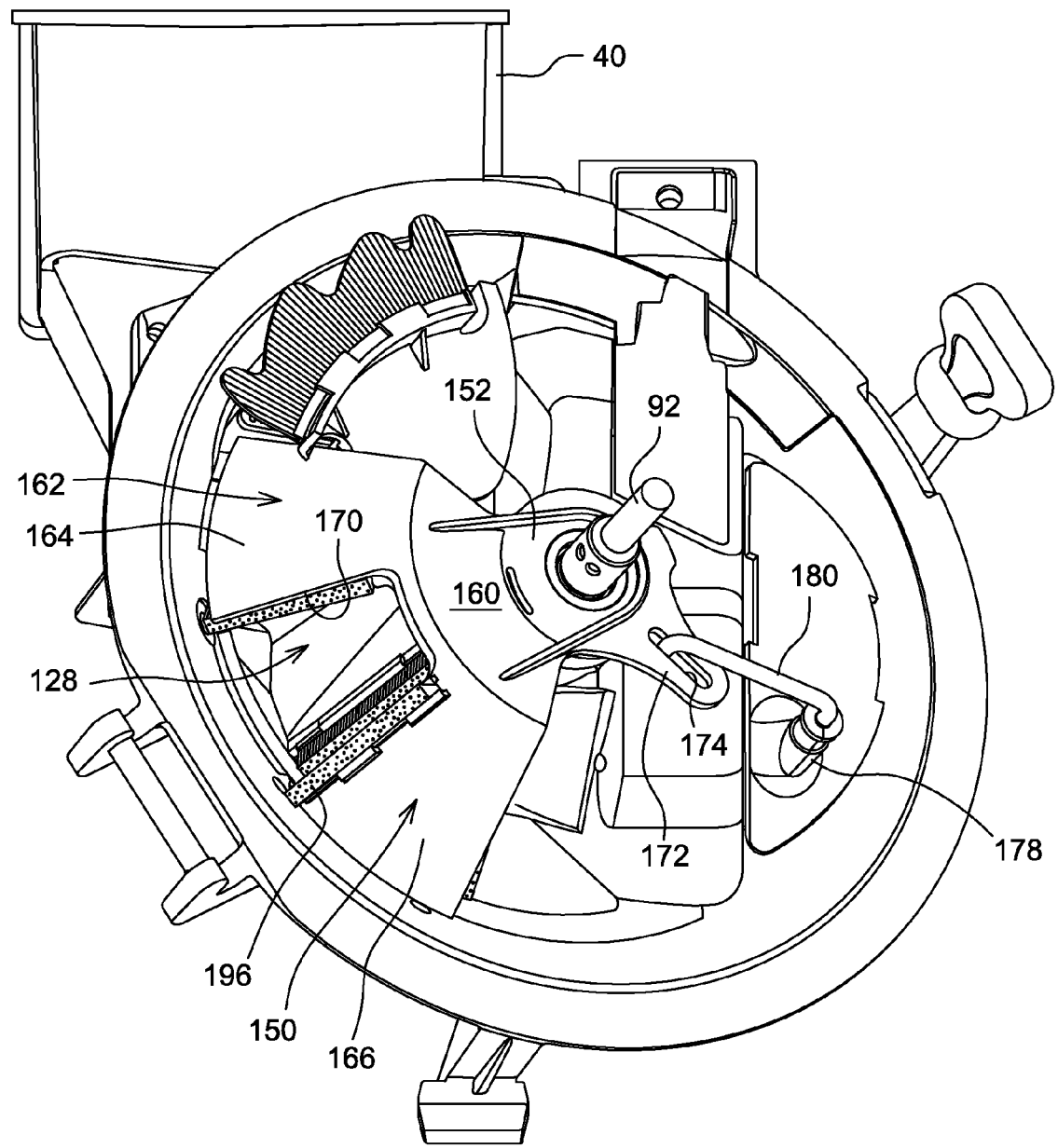

Operation of the actuator 184 to retract the plunger 186 causes counter-clockwise rotation of the crank about the axis 188 as viewed in FIG. 8. This causes clockwise rotation of the gate 150, moving the window 170 into alignment with the seed passage 128 while moving the wall portion 166 into alignment with the passage 130, thereby closing the passage with 130 as shown in FIG. 9. When rotating the gate, any seed in the seed pool beyond the paddle portion 162 of the gate is pushed upward by the brush 196 and remains in the seed pool and is mixed with seed from the passage 128. The number of seeds from the passage 130 mixed with seed from passage 128 will be relatively small. Likewise, when the gate is moved in the opposite direction to move the window from seed passage 128 to seed passage 130, seed from the passage 128 in the seed pool will move downward and mix with seed from passage 130.

Operation of the actuator 184 is controlled by a control system, not shown, that uses a seed prescription which defines where each of the seed varieties are to be planted in the field. A location system, such as a GPS system, determines the location of the machine in the field and then operates the actuator 184 to provide seed from seed passage 128 or seed passage 130 to the metering member 110 for planting at that location.

Figure 10:
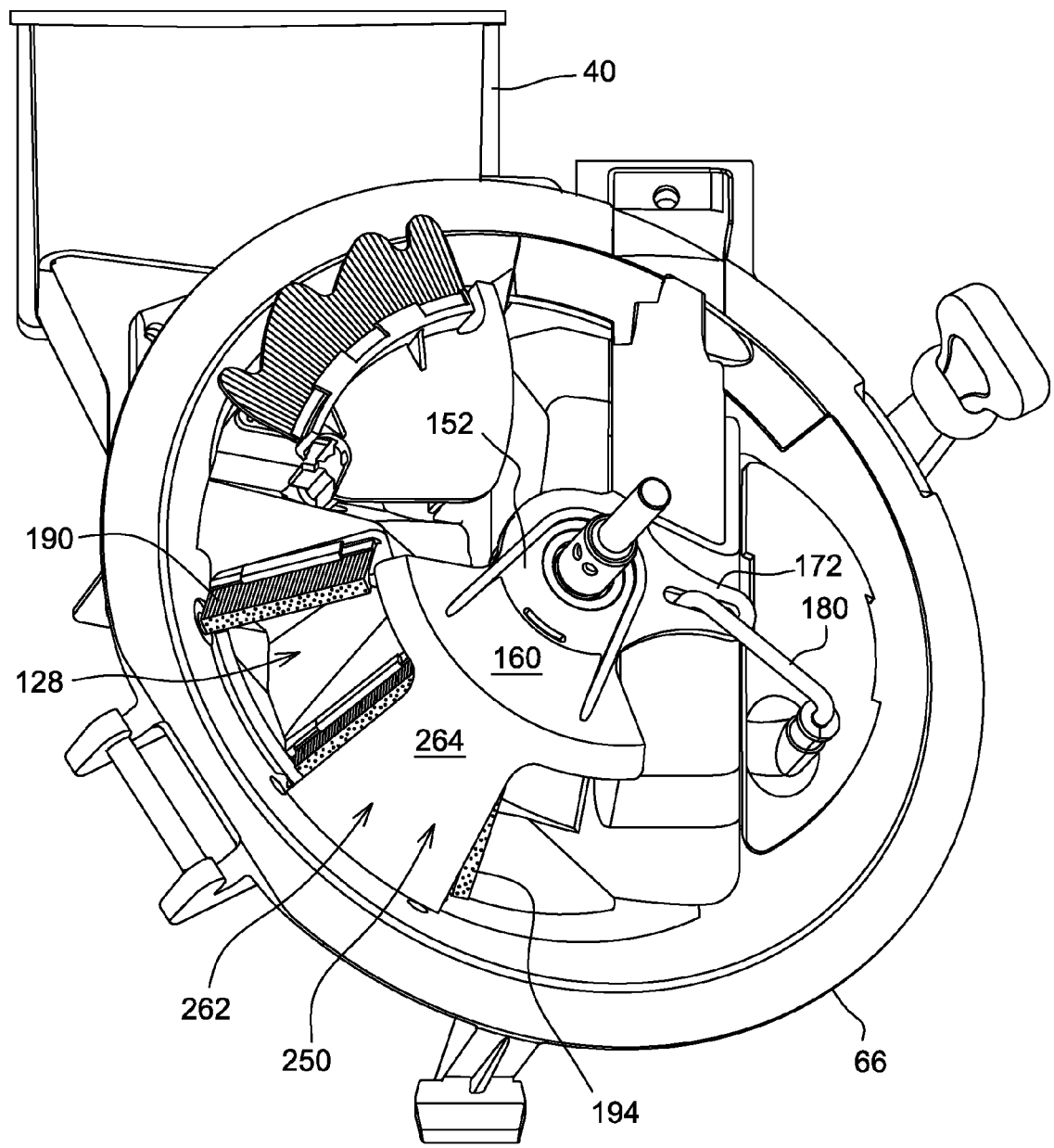
FIG. 10 is a perspective view like FIGS. 8 and 9 with an alternative embodiment of the gate shown in one position only.

An alternative embodiment of the gate is shown in FIG. 9 with the gate 250. The gate 250 has a hub portion 152, a first radial arm portion 160 and a second radial arm portion 172 like the gate 150. The gate 250 differs in that the paddle portion 262 only has one wall portion 264 and no window portion. The sole wall portion 264 moves between a first position covering the seed passage 128 to close that passage while the seed passage 130 is open and a second position (shown in FIG. 10) in which the wall portion covers and closes the seed passage 130 while the seed passage 128 is open. There is no brush below the open seed passage to contain the seed in the seed pool. The seed pool will be located at the bottom of the housing body 66.

Figure 11:
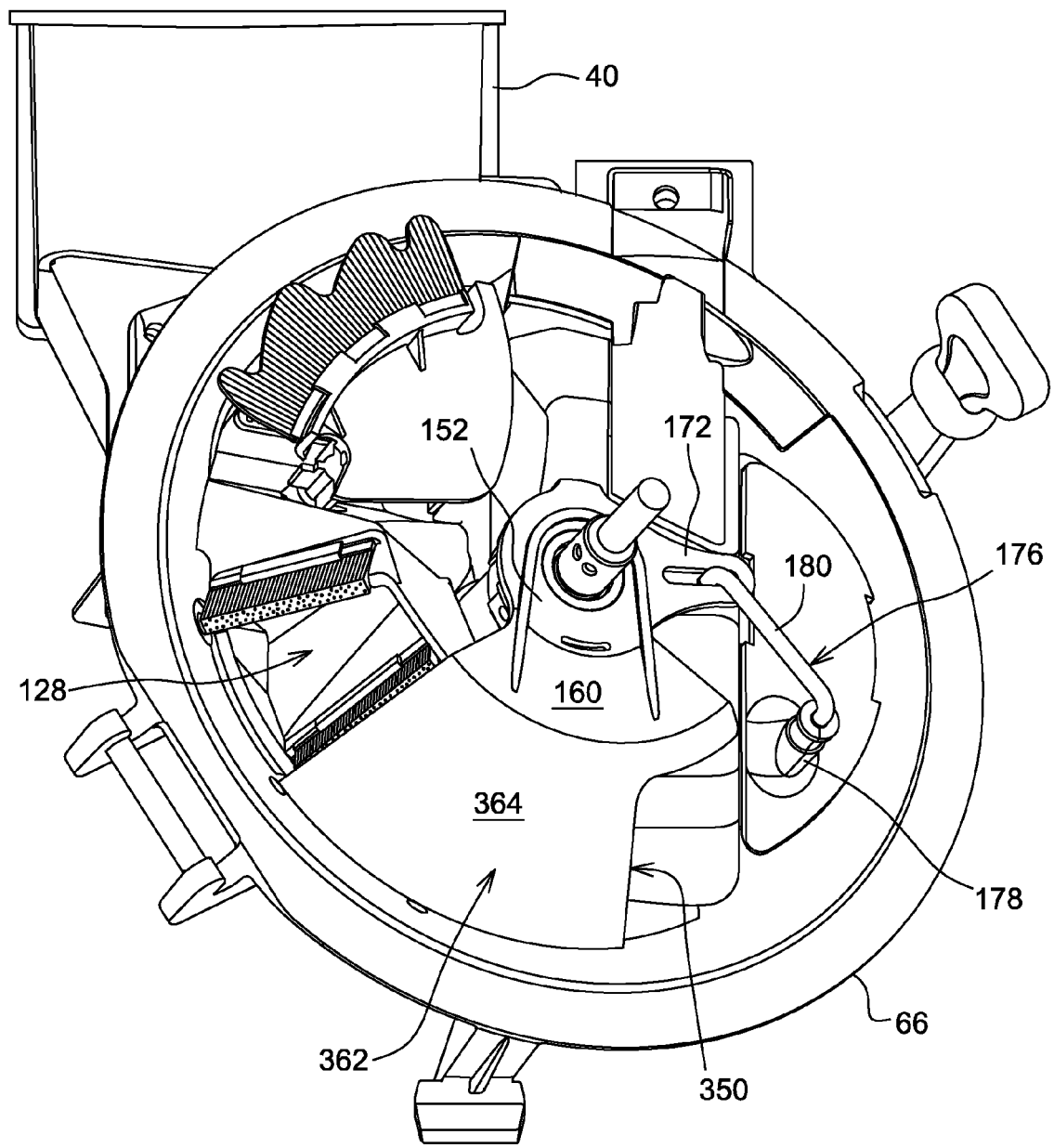
FIGS. 11, 12 and 13 are perspective views like FIG. 8 with yet another alternative embodiment of the gate shown in three positions.
Figure 12:
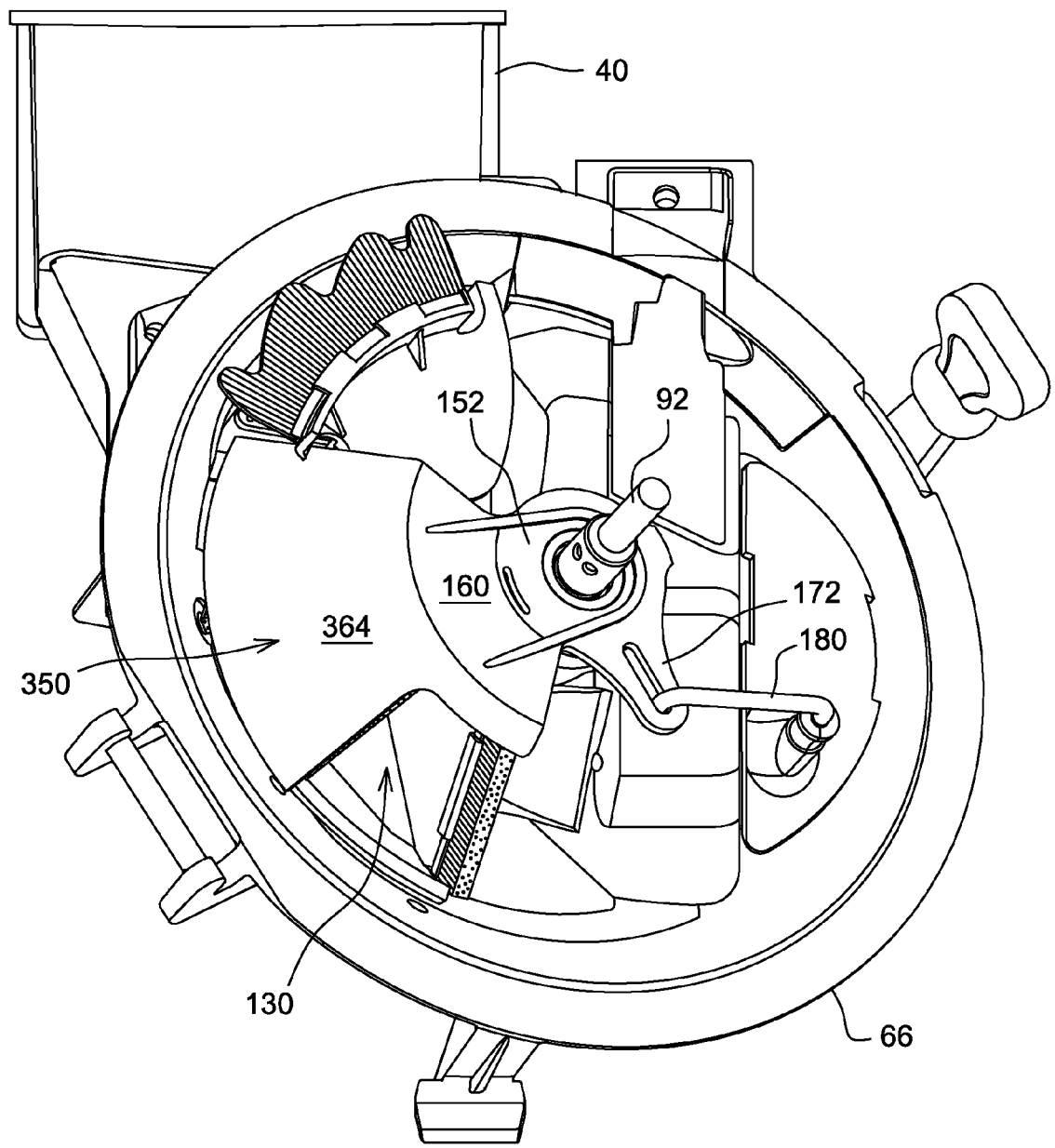
Figure 13:
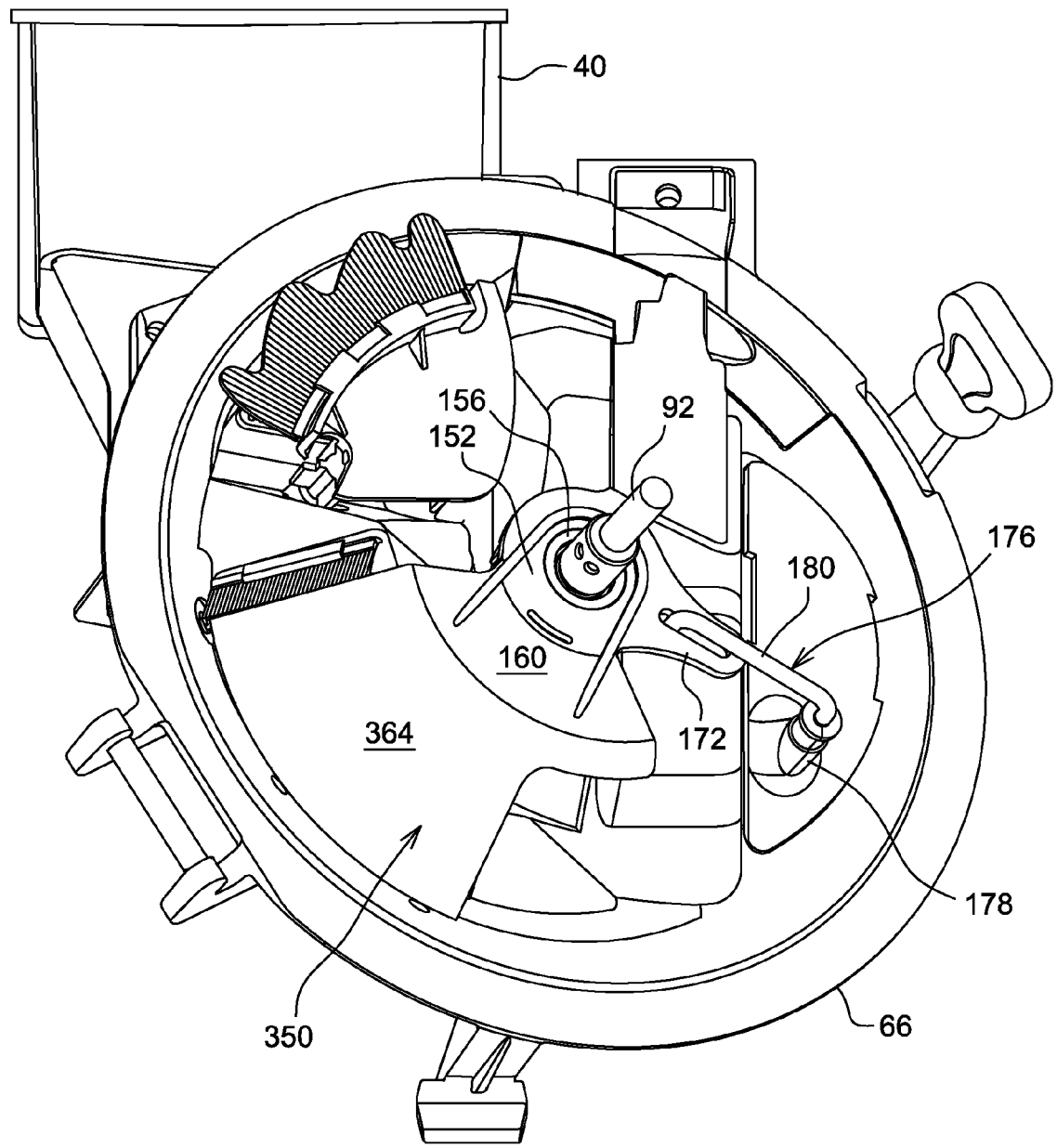

A third embodiment is shown in FIGS. 11-13. There, the gate 350 has a hub portion 152, a first radial arm portion 160 and a second radial arm portion 172 like the gates 150 and 250. The paddle portion 362 has a single wall portion 364 and no window. The wall portion 364 is large enough to close both the seed passages 128 and 130 simultaneously as shown in FIG. 13. The gate 350 is movable to another position showing in FIG. 11 in which the seed passage 128 is open and the seed passage 130 is closed. In yet another position, the gate closes the seed passage 128 and opens the seed passage 130 as shown in FIG. 12. To move from the position shown in FIG. 12 with the seed passage 130 open, to the position shown in FIG. 11 with the seed passage 128 open, the wall portion must move through the position shown in FIG. 13 in which both seed passages 128 and 130 are closed. In this position, seed in the seed pool in the meter housing can be substantially used before opening another seed passage. This reduces the amount of mixing of seed from both passages. The gate 350 thus has three positions, one position opening a first seed passage and closing a second seed passage, a second position opening the second seed passage and closing the first seed passage and a third position closing both the first and second seed passages. This is accomplished with a gate located in the meter housing, thus eliminating the need to package the gate on the outside of the meter housing where it may interfere with other components on the row unit.

Having described the seed meter and gate, it will become apparent that various modifications can be made without departing from the scope of the invention as defined in the accompanying claims.

What is claimed is:

1. A seed meter comprising:
    a seed meter housing having an enclosed interior and having an opening in the housing receiving first and second seed passages for delivery of seed to the housing interior;
    a metering member within the enclosed interior of the seed meter housing to singulate seed; and
    a gate enclosed within the seed meter housing movable between positions to close or open the seed passages wherein when a seed passage is open, seed is allowed to flow from the seed passage into the interior of the housing and wherein when a seed passage is closed, seed is blocked from flowing into the interior of the housing.

2. The seed meter of claim 1 wherein the gate has a hub portion mounting the gate for rotation about an axis, a radial arm portion extending radially from the hub portion and a paddle portion connected to the radial arm portion covering the seed passages to close the seed passages to the interior of the housing in at least one position of the gate.

3. The seed meter of claim 2 further comprising at least one brush at an open end of the seed passages having bristle that touch the paddle portion of the gate.

4. The seed meter of claim 2 further comprising a brush on the paddle portion of the gate having bristles that touch the metering member.

5. The seed meter of claim 2 wherein the paddle portion is in a plane inclined to a plane containing the hub portion.

6. The seed meter of claim 2 wherein the paddle portion is a frustum of a cone.

7. The seed meter of claim 2 further comprising a crank carried by the housing and connected to the radial arm portion.

8. The seed meter of claim 7 further comprising a linear actuator mounted to the housing and coupled to the crank to rotate the crank and thereby rotate the gate.

9. The seed meter of claim 8 wherein the crank passes through the housing of the seed meter and the linear actuator is mounted to the outside of the housing.

10. The seed meter of claim 7 wherein the crank is mounted to the housing of the seed meter for rotation.

11. A seed meter comprising:
    a seed meter housing having an interior and having an opening in the housing receiving first and second seed passages for delivery of seed to the housing interior;
    a metering member within the seed meter housing to singulate seed; and
    a gate within the seed meter housing movable between positions to close or open the seed passages wherein when a seed passage is open, seed is allowed to flow from the seed passage into the interior of the housing and wherein when a seed passage is closed, seed is blocked from flowing into the interior of the housing wherein the gate has a first position opening the first passage and closing the second passage and a second position opening the second passage and closing the first passage.

12. The seed meter of claim 11 wherein the gate has a third position closing both the first and second passages.

13. The seed meter of claim 11 wherein the metering member rotates about a meter axis and wherein the gate also rotates about the meter axis.

14. A gate within a seed meter of a seeding machine, the seeding machine having a conduit forming first and second seed passages for first and second seeds to pass into the meter, the seed meter having a seed meter housing having an interior and an opening for seed to pass into the seed meter housing from the seed passages and the meter having a metering member therein, the gate comprising:
    a hub portion mounting the gate in the seed meter housing for rotation about an axis;
    an arm extending radially from the hub portion; and
    a paddle portion connected to the arm opening or closing the seed passages based on the position of the gate, wherein the paddle portion comprises a portion that extends in a different plane from the arm.

15. The gate of claim 14 further comprising a second arm extending radially having a radial slot therein.

16. The gate of claim 15 wherein the hub portion and the radially extending arms lie in a common plane and the paddle portion is not in the common plane.

17. The gate of claim 16 wherein the paddle portion is a frustum of a cone.

18. The gate of claim 14 wherein the paddle portion has two wall sections separated by an open window portion therebetween.

* * * * *